United States Patent
Wallman

(10) Patent No.: US 6,820,101 B2
(45) Date of Patent: Nov. 16, 2004

(54) METHODS AND APPARATUS FOR OPTIMIZING GARBAGE COLLECTION USING SEPARATE HEAPS OF MEMORY FOR STORING LOCAL OBJECTS AND NON-LOCAL OBJECTS

(75) Inventor: David Wallman, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 134 days.

(21) Appl. No.: 09/752,886

(22) Filed: Dec. 28, 2000

(65) Prior Publication Data

US 2002/0087589 A1 Jul. 4, 2002

(51) Int. Cl.[7] .......................... G06F 12/00; G06F 17/30
(52) U.S. Cl. .................................................... 707/206
(58) Field of Search .................... 707/1, 100, 103 Y, 707/200, 205, 206; 717/148, 154; 713/167

(56) References Cited

U.S. PATENT DOCUMENTS

| | | | |
|---|---|---|---|
| 5,799,185 A | 8/1998 | Watanabe | |
| 6,047,125 A | 4/2000 | Agesen et al. | 717/148 |
| 6,247,027 B1 | 6/2001 | Chaudhry et al. | 707/206 |
| 6,253,215 B1 * | 6/2001 | Agesen et al. | 707/206 |
| 6,275,985 B1 | 8/2001 | Ungar et al. | 717/148 |
| 6,317,872 B1 | 11/2001 | Gee et al. | 717/152 |
| 6,381,738 B1 | 4/2002 | Choi et al. | 717/140 |
| 6,446,257 B1 * | 9/2002 | Pradhan et al. | 717/154 |
| 6,453,463 B1 | 9/2002 | Chaudhry et al. | 717/127 |
| 6,457,023 B1 | 9/2002 | Pinter et al. | 707/206 |
| 6,473,773 B1 | 10/2002 | Cheng et al. | 707/200 |
| 6,480,862 B1 | 11/2002 | Gall | 707/3 |
| 6,490,670 B1 | 12/2002 | Collins et al. | 711/173 |
| 6,499,095 B1 | 12/2002 | Sexton et al. | 711/203 |
| 6,546,546 B1 | 4/2003 | Van Doorn | 717/114 |
| 6,581,077 B2 | 6/2003 | Sokolov et al. | 707/206 |
| 6,604,182 B1 | 8/2003 | Sexton et al. | 711/170 |
| 6,625,808 B1 | 9/2003 | Tarditi | 717/154 |
| 6,757,890 B1 * | 6/2004 | Wallman | 717/148 |

FOREIGN PATENT DOCUMENTS

| | | |
|---|---|---|
| WO | WO 00/10090 | 2/2000 |

OTHER PUBLICATIONS

Visual Café for JAVA Database Development Edition, William B. Brogden et al., published Jan. 28, 1998, pp. 398, 556 and 558.

Incremental Mature Garbage Collection Steffen Grarup et al., Aarthus University, Aug. 1993, Whole manual.

\* cited by examiner

*Primary Examiner*—Uyen Le
*Assistant Examiner*—Marc Filipczyk
(74) *Attorney, Agent, or Firm*—Beyer Weaver & Thomas LLP

(57) ABSTRACT

Methods and apparatus for executing a method to enable memory associated with objects not referenced external to the executed method to be reclaimed upon completion of execution of the method. Methods include obtaining a data structure including one or more addresses of source code that creates local objects, obtaining next source code in the method, and determining whether an address of the obtained next source code is in the data structure. When the address of the obtained next source code is in the data structure including one or more addresses of source code that creates local objects, a local object is created on a local heap of memory using the source code associated with the address such that local objects are stored in memory separately from non-local objects.

29 Claims, 6 Drawing Sheets

| Index | Addresses |
|---|---|
| 1 | Address 1 |
| 2 | Address 2 |
| 3 | Address 3 |
| 4 | Address 4 |
|   |   |
|   |   |

302 — Index
304 — Addresses

METHODS AND APPARATUS FOR OPTIMIZING GARBAGE COLLECTION USING SEPARATE HEAPS OF MEMORY FOR STORING LOCAL OBJECTS AND NON-LOCAL OBJECTS

CROSS REFERENCE TO RELATED APPLICATIONS

This invention is related to U.S. patent application Ser. No. 09/752,888, filed on the same day, naming David Wallman as inventor, and entitled "METHODS AND APPARATUS FOR ENABLING LOCAL JAVA OBJECT ALLOCATION AND COLLECTION." That application is incorporated herein by reference in its entirety and for all purposes.

BACKGROUND OF THE INVENTION

1. Field of the Invention

The present invention relates generally to computer software. More particularly, the present invention relates to improving the allocation of memory to local objects and the reclaiming of the memory allocated to the local objects,

2. Discussion of Related Art

The JAVA™ Virtual Machine does not provide explicit methods to release memory allocated to objects which are no longer in use. Instead, the Java runtime environment relies upon garbage collection to identify and reclaim objects no longer in use automatically. Garbage collection relies upon the observation that a previously allocated memory location that is no longer referenced by any pointers is no longer accessible to the application and is therefore reclaimable. The role of the garbage collector is to identify and recycle these inaccessible allocated memory chunks.

Two commonly used garbage collection methods include "mark and sweep" garbage collection and copying garbage collection. Mark and sweep garbage collection is typically performed in two passes. During the first pass, each object that is not referenced by any objects is marked for deletion. During the second pass, the memory for each object that is not marked is reclaimed.

During copying garbage collection, all objects that are referenced by one or more objects are copied while those objects that are not referenced by any other objects are not copied. Once copied, the memory for the original objects may then be reclaimed.

Most garbage collection optimizations address specific garbage collection algorithms allowing faster and better allocation of space for new objects and the freeing of space allocated to dead objects (i.e., objects that are no longer referenced). In other words, other such garbage collection optimization schemes address issues related to how to allocate and collect objects. More particularly, these garbage collection optimization schemes treat all objects equally, rather than treating each type of object differently.

There are generally two types or classes of objects. The first type of object is a "local" object. Local objects are those objects created during Java method execution and not referenced after the method execution completes. In other words, these local objects operate as temporary objects, since they are not referenced outside the scope of the method. All other objects belong to the second class, or are "non-local" objects. Previously implemented systems and garbage collection optimization schemes fail to treat these two types of objects differently.

In view of the above, it would be desirable if memory could be reclaimed for objects no longer referenced in an efficient manner. Moreover, it would be desirable if memory could be reclaimed through the identification of different types of objects. More specifically, it would be beneficial if the differences between local and non-local objects could be applied to improve the efficiency of the reclaiming of memory occupied by local objects. In addition, it would be beneficial if memory no longer in use could be reclaimed without performing garbage collection.

SUMMARY

The present invention enables memory to be reclaimed for objects no longer referenced. This is accomplished, in part, through the identification of particular types of objects (e.g., local objects). In this manner, memory associated with various types of objects may be reclaimed when no longer in use.

In accordance with one aspect of the present invention, specific types of objects are identified to enable memory associated with the identified objects to be reclaimed. Methods include identifying one or more objects of a first object type, obtaining one or more addresses of source code adapted for creating the one or more objects identified as the first object type when the source code is executed, and performing class file generation such that the one or more addresses are stored in a data structure in one or more class files.

In accordance with another aspect of the present invention, methods and apparatus for executing a method to enable memory associated with objects not referenced external to the executed method to be reclaimed upon completion of execution of the method. Methods include obtaining a data structure including one or more addresses of source code that creates local objects, obtaining next source code in the method, and determining whether an address of the obtained next source code is in the data structure. When the address of the obtained next source code is in the data structure including one or more addresses of source code that creates local objects, a local object is created on a local heap of memory using the source code associated with the address such that local objects are stored in memory separately from non-local objects.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
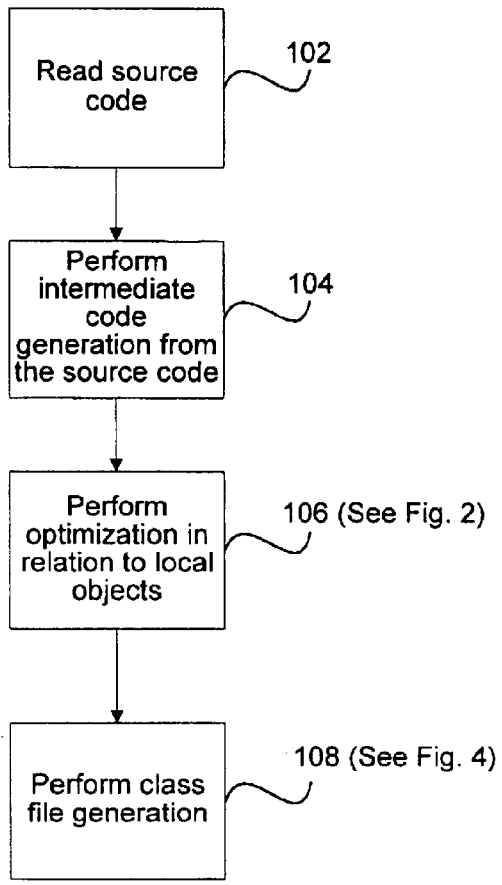
FIG. 1 is a general process flow diagram in which a compiler analyzes objects in methods called and stores information related to this analysis.

FIG. 1 is a general process flow diagram in which a compiler analyzes objects in methods called and stores information related to this analysis. As shown at block 102, the compiler reads a set of source code. Intermediate code generation is then performed from the source code at block 104. The intermediate code may be described as a second set of source code. For instance, the second set of source code may be Java bytecodes. Optimization is then performed in relation to local objects at block 106. One method of performing optimization will be described in further detail below with reference to FIG. 2. Class file generation is performed at block 108. One method for performing class file (e.g., Java class file) generation will be described in further detail below with reference to FIG. 4.

Figure 2:
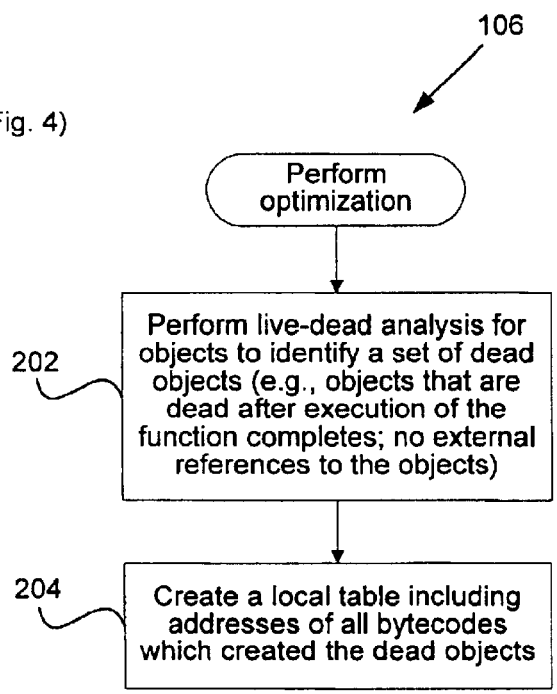
FIG. 2 is a process flow diagram illustrating a method of performing optimization in relation to local objects as shown at block 106 of FIG. 1.

FIG. 2 is a process flow diagram illustrating a method of performing optimization in relation to a particular type of objects (e.g., local objects) as shown at block 106 of FIG. 1. As shown at block 202, one or more objects of a first object type are identified. More particularly, in accordance with one embodiment, live-dead analysis is performed to identify a set of "dead" objects. Dead objects are those objects that are dead after execution of the method completes. In other words, there are no references to the object external to the method. These dead objects are typically created (i.e., instantiated) during execution of the method. Although live-dead analysis is a well-known process, live-dead analysis is typically performed for analysis of variables rather than objects.

Once the objects of the first object type are identified, addresses of the corresponding source code (e.g., bytecodes) adapted for creating the identified objects when the source code is executed are obtained. More particularly, once the local objects are identified, a local table is created at block 204 that includes addresses of all source code (e.g., bytecodes) adapted for creating the local objects during method execution. The local table may be implemented as any one of a variety of data structures, including, but not limited to, an array, linked list, or other suitable data structure. Moreover, the local table may be created dynamically or statically.

Figures 3, 4:
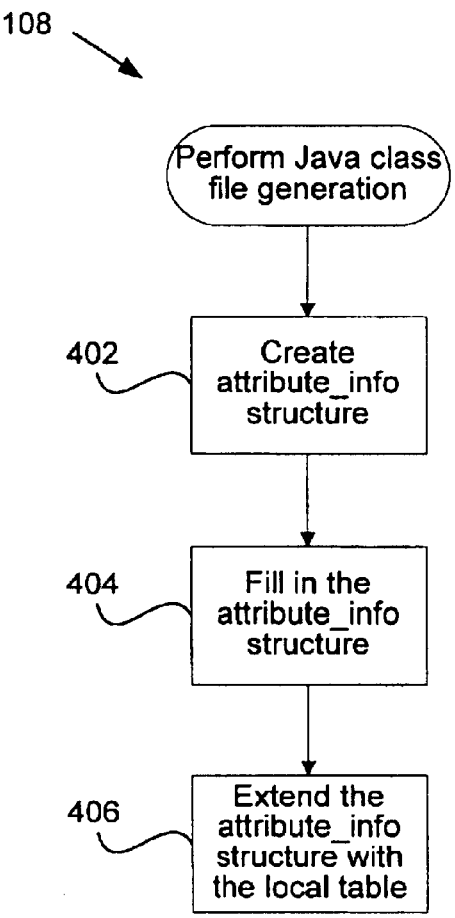
FIG. 3 is a diagram illustrating an exemplary local table that may be created at block 204 of FIG. 2.
FIG. 4 is a process flow diagram illustrating a method of performing class file generation as shown at block 108 of FIG. 1.

FIG. 3 is a diagram illustrating an exemplary local table that may be created at block 204 of FIG. 2. As shown, the local table may be implemented as an array. For instance, the array shown has one or more array elements identified by an index 302. Each array element includes an address 304 corresponding to bytecodes that have been identified to create a local object. Thus, the local table includes addresses of substantially all bytecodes that are used to create local objects.

In addition to, or instead of, storing information in the local table that has been created, it may be desirable to store the relevant information from the local table in a second data structure that is compliant with the system being used. For instance, it may be desirable to store information from the local table in a data structure that is compliant with the Java class file format. FIG. 4 is a process flow diagram illustrating a method of performing class file generation as shown at block 108 of FIG. 1. In accordance with one embodiment, class file generation is performed such that one or more addresses of source code (e.g., Java bytecode) are stored in a second data structure in one or more class files. The semantics of the Java class file enables any number of attributes for a particular Java method to be introduced. More particularly, an attribute_info structure is typically used to store class attributes, as will be appreciated by those skilled in the art. As shown at block 402, the second data structure is created. In accordance with one embodiment, the data structure is an attribute_info structure. Thus, at block 404 the attribute_info structure is filled in with this attribute information. Then, at block 406, the attribute_info structure is extended to include information from the local table, as described above. For instance, a new Java method attribute, "local objects," may be created, where information related to local objects is stored. Selected information from the first data structure (e.g., local table) may be provided in the attribute_info structure. This information preferably includes the addresses of the source code adapted for creating the objects during execution of the source code. Alternatively, the entire first data structure (e.g., local table) may be provided in the attribute_info structure.

Figure 5:
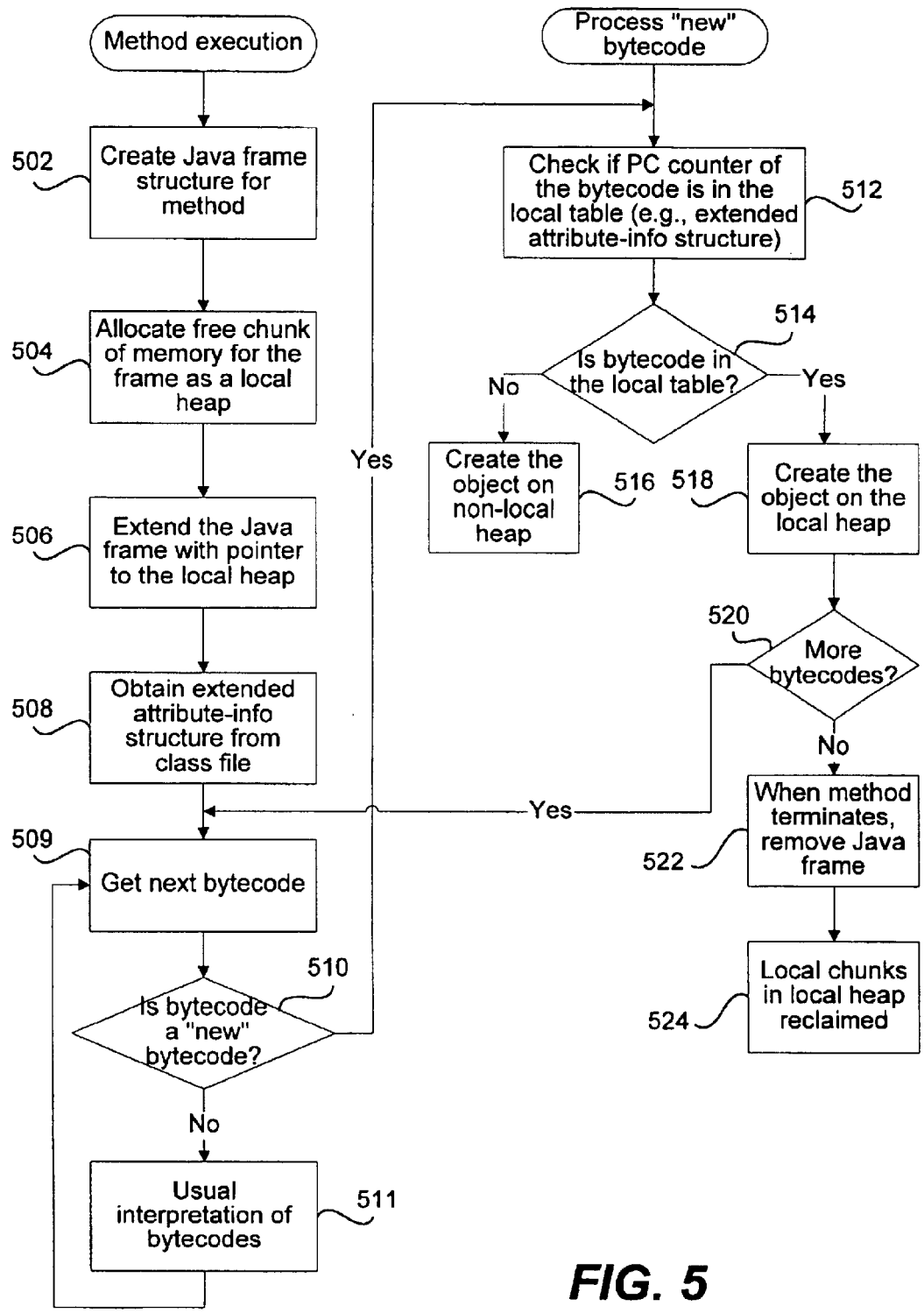
FIG. 5 is a process flow diagram illustrating a method of performing method execution using information stored in a data structure such as that created in FIG. 2 or FIG. 4.

Once the addresses associated with the identified objects have been stored in a data structure, this information may be used to allocate memory for storage of these objects during method execution as well as to reclaim this memory upon termination of the method. FIG. 5 is a process flow diagram illustrating a method of performing method execution using information stored in a data structure such as that created in FIG. 2 or FIG. 4 in accordance with one embodiment of the invention. A Java Virtual Machine (JVM) supports a Java frame structure that stores dynamic information related to method execution. The Java frame structure is typically a structure in a Java interpreter. As shown at block 502, a dynamic structure adapted for storing dynamic information related to method execution such as a Java frame structure is created. A free chunk of available memory is then allocated as the local heap for storage of one or more objects (e.g., local objects) at block 504. The local heap is then associated with the Java frame structure at block 506. For example, a pointer from the Java frame may be extended to the local heap. A data structure including one or more addresses of source code that creates local objects is obtained at block 508. As described above, the data structure that is obtained may be a data structure such as a local table or an attribute_info structure from a Java class file.

Once the data structure has been obtained, this data structure may be used to allocate memory for objects during method execution. Thus, at block 509, the next source code (e.g., a next bytecode) is obtained. Next, at block 510 it is determined whether the bytecode is a "new" bytecode. More particularly, a "new" bytecode creates objects while other bytecodes do not create objects. When the bytecode is not a "new" bytecode, the bytecodes are interpreted at block 511. Otherwise, the bytecode is a "new" bytecode that creates one or more objects.

The "new" bytecode is then processed as follows. At block 512 it is determined whether an address of the obtained next source code is in the data structure. For instance, the Program Counter (PC) of the bytecode may be compared with the addresses in the data structure. If it is determined at block 514 that the bytecode is not in the data structure, the corresponding object is created from the bytecode on a non-local heap of memory. However, if the bytecode is in the data structure, the corresponding object is created from the bytecode on the local heap of memory at block 518. In this manner, local objects are stored in memory separately from non-local objects. The method repeats at block 509 for remaining bytecodes as shown at block 520. Accordingly, all local objects are created on the local heap.

When execution of the method terminates, memory associated with the local heap is reclaimed. In other words, this memory that is associated with the local heap is returned to a pool of available memory. More particularly, the Java frame is removed from memory at block 522. All chunks in the local heap may then be reclaimed at block 524. Thus, local objects are removed upon method termination. Accordingly, explicit garbage collection is not required to remove these objects from memory.

Figure 6:
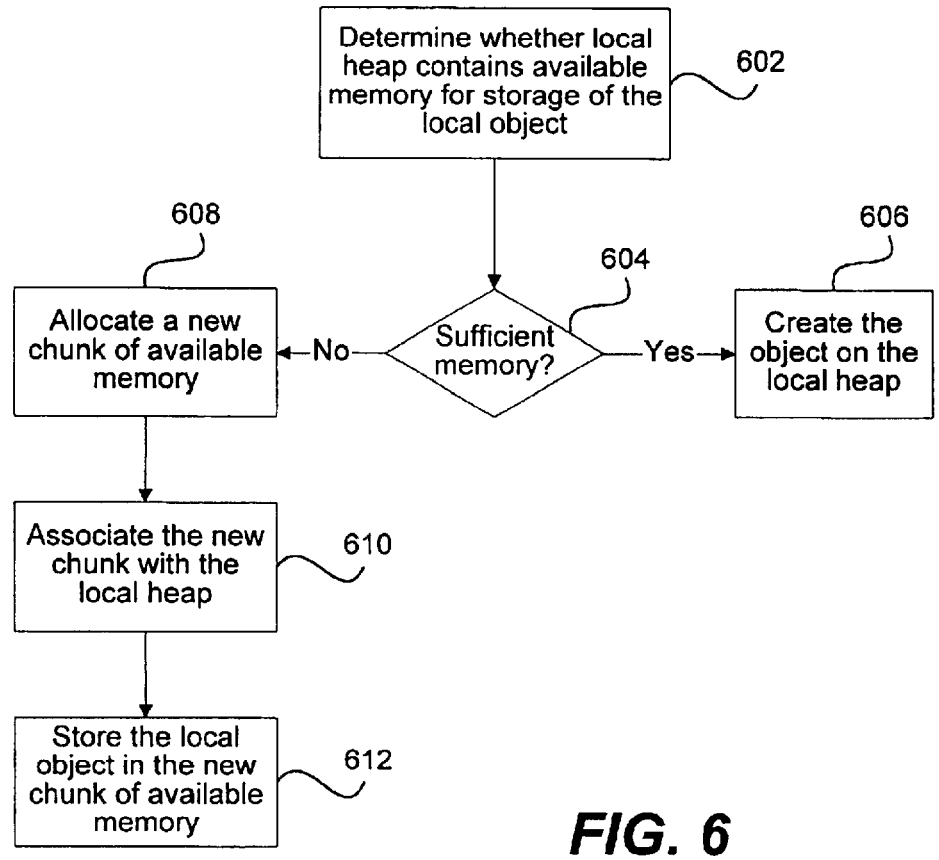
FIG. 6 is a process flow diagram illustrating a method of creating an object on a local heap as shown at block 518 of FIG. 5.

The local heap may include one or more chunks of memory that are linked to the local heap dynamically. Thus, when an object is created on the local heap as described above with reference to block 518, it may be necessary to add a new chunk of memory to the local heap. FIG. 6 is a process flow diagram illustrating a method of creating an object on a local heap as shown at block 518 of FIG. 5. At block 602 it is determined whether the local heap contains available memory for storage of the local object. At block 604 if it has been determined whether there is sufficient memory, the object is created on the local heap at block 606. Otherwise, if it has been determined that there is insufficient memory, a new chunk of available memory is allocated at block 608. At block 610 the new chunk is associated with the local heap. For instance, a pointer to the new chunk may be provided such that the local heap is composed of a linked list of memory chunks. The local object is then stored in the new chunk of available memory at block 612.

Figure 7:
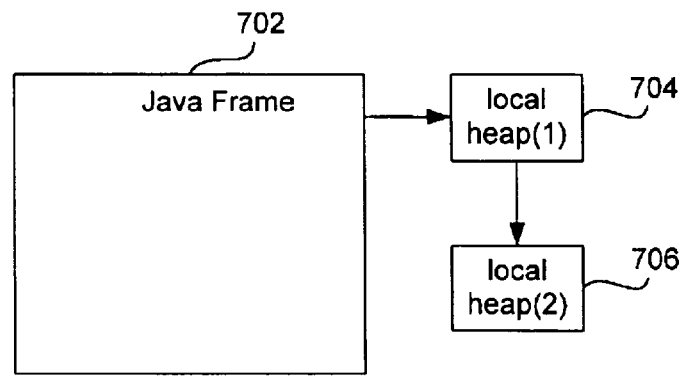
FIG. 7 is a block diagram illustrating an exemplary memory allocation scheme that may be used during method execution such as that illustrated in FIG. 5.

FIG. 7 is a block diagram illustrating an exemplary memory allocation scheme that may be used during method execution such as that illustrated in FIG. 5. As shown, a Java frame 702 maintains a pointer to a local heap that consists of two chunks of memory, 704 and 706. More particularly, the Java frame 702 points to the first chunk of memory 704. The first chunk of memory 704 maintains a pointer to the second chunk of memory 706. Additional chunks of memory are allocated as necessary during method of execution. Upon completion of execution, the Java frame 702 is deleted and the chunks 704 and 706 are reclaimed.

The present invention enables local objects to be advantageously stored in memory such that the memory may easily be reclaimed upon termination of execution of the corresponding method. This reduces garbage collection time, particularly during mark and sweep garbage collection, since there is no need for the most time consuming marking phase. Moreover, since the number of memory chunks in the local heap will likely be significantly lower than the number of objects, the sweep (and compact) phase will be performed in less time.

Figure 8:
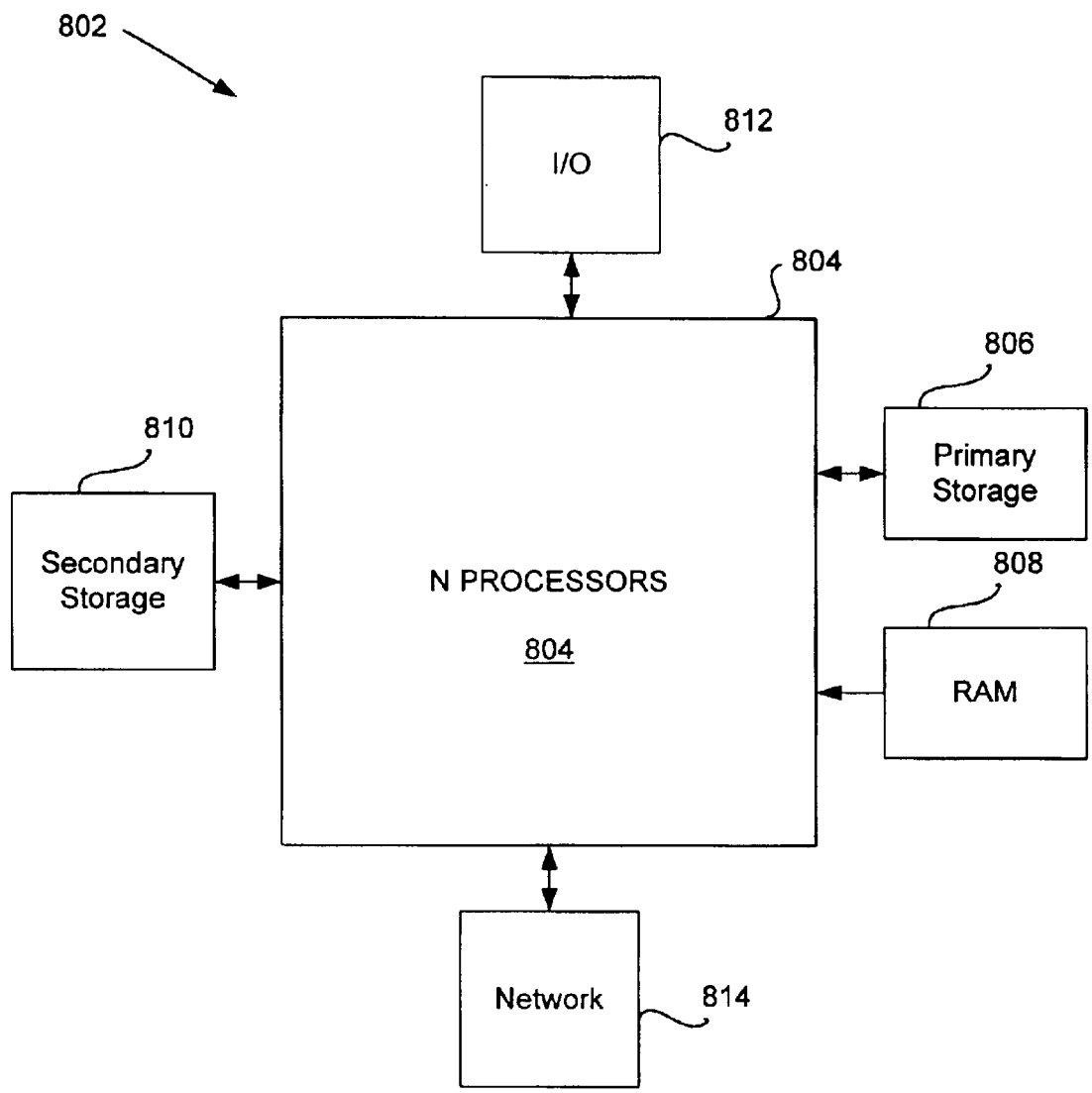
FIG. 8 is a block diagram illustrating a typical, general-purpose computer system suitable for implementing the present invention.

The present invention may be implemented on any suitable computer system. FIG. 8 illustrates a typical, general-purpose computer system 802 suitable for implementing the present invention. The computer system may take any suitable form. For example, the computer system may be integrated with a digital television receiver or set top box.

Computer system 830 or, more specifically, CPUs 832, may be arranged to support a virtual machine, as will be appreciated by those skilled in the art. The computer system 802 includes any number of processors 804 (also referred to as central processing units, or CPUs) that may be coupled to memory devices including primary storage device 806 (typically a read only memory, or ROM) and primary storage device 808 (typically a random access memory, or RAM). As is well known in the art, ROM acts to transfer data and instructions uni-directionally to the CPUs 804, while RAM is used typically to transfer data and instructions in a bi-directional manner. Both the primary storage devices 806, 808 may include any suitable computer-readable media. The CPUs 804 may generally include any number of processors.

A secondary storage medium 810, which is typically a mass memory device, may also be coupled bi-directionally to CPUs 804 and provides additional data storage capacity. The mass memory device 810 is a computer-readable medium that may be used to store programs including computer code, data, and the like. Typically, the mass memory device 810 is a storage medium such as a hard disk which is generally slower than primary storage devices 806, 808.

The CPUs 804 may also be coupled to one or more input/output devices 812 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 804 optionally may be coupled to a computer or telecommunications network, e.g., an internet network or an intranet network, using a network connection as shown generally at 814. With such a network connection, it is contemplated that the CPUs 804 might receive information from the network, or might output information to the network in the course of performing the above-described method steps. Such information, which is often represented as a sequence of instructions to be executed using the CPUs 804, may be received from and outputted to the network, for example, in the form of a computer data signal embodied in a carrier wave.

Figure 9:
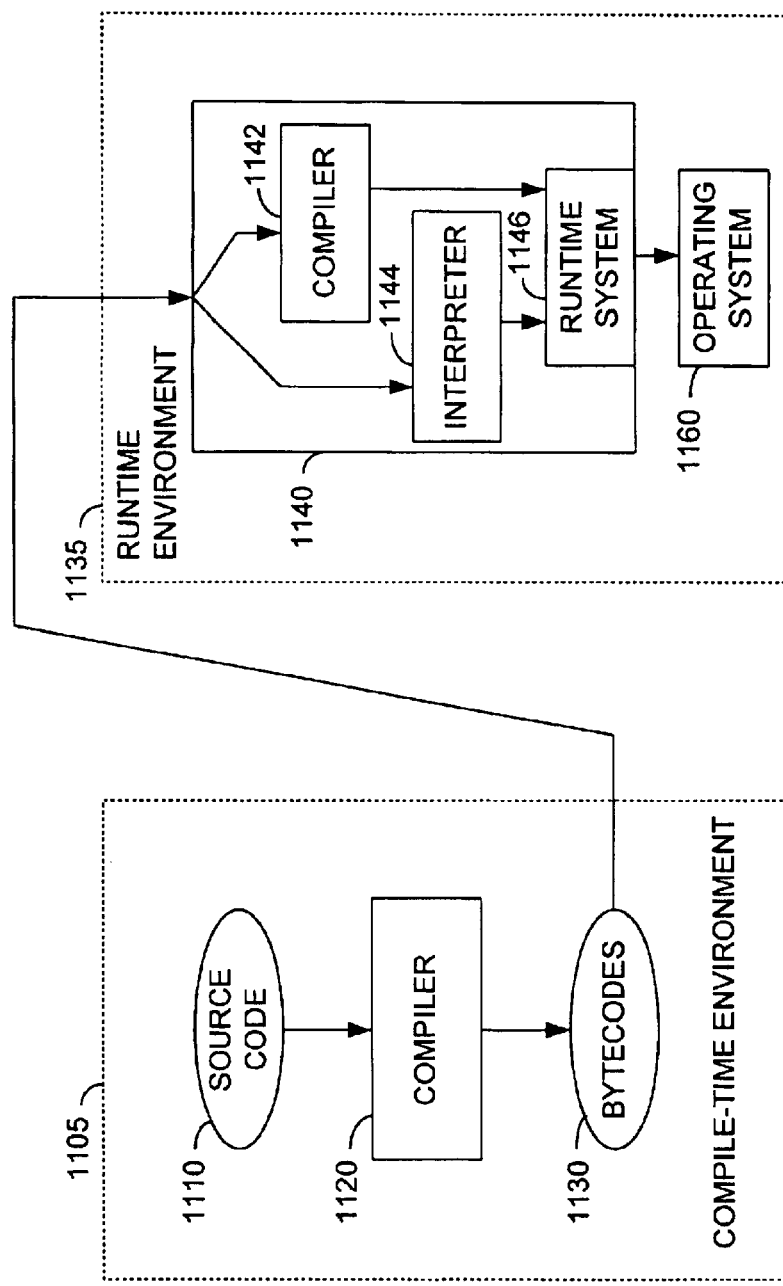
FIG. 9 is a diagrammatic representation of a virtual machine suitable for implementing the present invention.

As previously mentioned, a virtual machine may execute on computer system 1030. FIG. 9 is a diagrammatic representation of a virtual machine which is supported by the computer system of FIG. 8, and is suitable for implementing the present invention. When a computer program, e.g., a computer program written in the Java™ programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 6, or stored on a storage device such as primary storage 1034 of FIG. 6. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 5. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented within the context of a digital television receiver. However, the present invention may be used in other contexts. Moreover, although the present invention is described as being implemented on a Java™ platform, it may also be implemented on a variety of platforms. Moreover, the above described process blocks are illustrative only. Therefore, the implementation of the present invention may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. A method of executing a set of source code instructions to enable memory associated with objects not referenced external to the executed set of source code instructions to be reclaimed upon completion of execution of the executed set of source code instructions, comprising:

obtaining a data structure storing one or more addresses of one or more of the set of source code instructions that creates one or more local objects, the one or more local objects being created during execution of the set of source code instructions and are not referenced outside the set of source code instructions;

obtaining a next source code instruction from the set of source code instructions;

determining whether an address of the next source code instruction is in the data structure;

when the address of the next source code instruction is in the data structure including one or more addresses of one or more of the set of source code instructions that creates one or more local objects upon execution of the one or more of the set of source code instructions, creating a local object on a local heap of memory using the next_source code instruction associated with the address of the next source code instruction such that local objects are stored in memory separately from non-local objects; and when the address of the next source code is not in the data structure including one or more addresses of one or more of the set of source code instructions that creates one or more local objects, creating a non-local object on a non-local heap of memory using the next source code associated with the address of the next source code such that non-local objects are stored in memory separately from local objects.

2. The method as recited in claim 1, wherein determining whether the address of the next source code instruction is in the data structure comprises:

determining whether a program counter of the next source code is in the data structure.

3. The method as recited in claim 1, further comprising:

reclaiming memory associated with the local heap upon termination of execution of the set of source code instructions.

4. The method as recited in claim 3, wherein reclaiming memory is performed during garbage collection.

5. The method as recited in claim 4, wherein the garbage collection is mark and sweep garbage collection.

6. The method as recited in claim 1, further comprising:

returning memory associated with the local heap to a pool of available memory upon termination of execution of the set of source code instructions.

7. The method as recited in claim 1, further comprising:

creating a dynamic structure adapted for storing dynamic information related to execution of the set of source code instructions; and associating the local heap with the dynamic structure.

8. The method as recited in claim 7, wherein associating the local heap with the dynamic structure comprises extending a pointer from the dynamic structure to the local heap.

9. The method as recited in claim 7, wherein the dynamic structure is a Java frame.

10. The method as recited in claim 9, wherein the Java frame is a data structure in a Java interpreter.

11. The method as recited in claim 10, further comprising:

removing the Java frame from memory when execution of the set of source code instructions terminates.

12. The method as recited in claim 10, wherein the bytecodes are Java bytecodes.

13. The method as recited in claim 1, further comprising:

allocating a free chunk of available memory as the local heap for storage of one or more local objects.

14. The method as recited in claim 1, wherein the local heap comprises one or more chunks of memory, wherein creating a local object on a local heap of memory using the next source code instruction comprises:

determining whether the local heap contains available memory for storage of the local object;

when the local heap contains available memory sufficient for storage of the local object, creating the local object in one of the chunks of memory;

when the local heap does not contain available memory sufficient for storage of the local object, allocating a new chunk, associating the new chunk with the local heap, and storing the local object in the new chunk.

15. The method as recited in claim 14, wherein associating the new chunk with the local heap comprises providing a pointer to the new chunk such that the local heap is composed of a linked list of memory chunks.

16. The method as recited in claim 1, wherein obtaining a data structure including one or more addresses of source code that creates local objects comprises:

obtaining an attribute_info structure from a Java class file, wherein the data structure is the attribute_info structure of the Java class file.

17. The method as recited in claim 16, further comprising:
performing class file generation such that information from a second data structure is stored in the attribute_info structure of the Java class file.

18. The method as recited in claim 16, further comprising:
performing class file generation such that the data structure is generated.

19. The method as recited in claim 1, wherein the set of source code instructions comprises bytecodes.

20. The method as recited in claim 1, further comprising:
compiling the set of source code instructions to generate the data structure.

21. The method as recited in claim 20, wherein the source code is generated when a method is compiled.

22. The method as recited in claim 21, wherein the source code comprises bytecodes.

23. The method as recited in claim 1, further comprising:
generating the data structure.

24. The method as recited in claim 23, further comprising:
performing live-dead analysis on the source code to identify a set of dead objects, each of the set of dead objects being a local object.

25. The method as recited in claim 1, further comprising:
executing or interpreting the next source code instruction.

26. The method as recited in claim 1, wherein the data structure is generated during compilation of the set of source code instructions.

27. A computer-readable medium for executing a set of source code instructions to enable memory associated with objects not referenced external to the executed set of source code instructions to be reclaimed upon completion of execution of the executed set of source code instructions, comprising:
   instructions for obtaining a data structure storing one or more addresses of one or more of the set of source code instructions that creates one or more local objects, the one or more local objects being created during execution of the set of source code instructions and are not referenced outside the set of source code instructions;
   instructions for obtaining a next source code instruction from the set of source code instructions;
   instructions for determining whether an address of the next source code instruction is in the data structure;
   instructions for when the address of the next source code instruction is in the data structure including one or more addresses of one or more of the set of source code instructions that creates one or more local objects upon execution of the one or more of the set of source code instructions, creating a local object on a local heap of memory using the next source code instruction associated with the address of the next source code instruction such that local objects are stored in memory separately from non-local objects; and
   instructions for when the address of the next source code is not in the data structure including one or more addresses of one or more of the set of source code instructions that creates one or more local objects, creating a non-local object on a non-local heap of memory using the next source code associated with the address of the next source code such that non-local objects are stored in memory separately from local objects.

28. An apparatus for executing a set of source code instructions to enable memory associated with objects not referenced external to the executed set of source code instructions to be reclaimed upon completion of execution of the executed set of source code instructions, comprising:
   means for obtaining a data structure storing one or more addresses of one or more of the set of source code instructions that creates one or more local objects, the one or more local objects being created during execution of the set of source code instructions and are not referenced outside the set of source code instructions;
   means for obtaining a next source code instruction from the set of source code instructions;
   means for determining whether an address of the next source code instruction is in the data structure;
   means for when the address of the next source code instruction is in the data structure including one or more addresses of one or more of the set of source code instructions that creates one or more local objects upon execution of the one or more of the set of source code instructions, creating a local object on a local heap of memory using the next_source code instruction associated with the address of the next source code instruction such that local objects are stored in memory separately from non-local objects; and
   means for when the address of the next source code is not in the data structure including one or more addresses of one or more of the set of source code instructions that creates one or more local objects, creating a non-local object on a non-local heap of memory using the next source code associated with the address of the next source code such that non-local objects are stored in memory separately from local objects.

29. An apparatus for executing a set of source code instructions to enable memory associated with objects not referenced external to the executed set of source code instructions to be reclaimed upon completion of execution of the executed set of source code instructions, comprising:
   a processor; and
   a memory, at least one of the processor and the memory being adapted for:
   obtaining a data structure storing one or more addresses of one or more of the set of source code instructions that creates one or more local objects, the one or more local objects being created during execution of the set of source code instructions and are not referenced outside the set of source code instructions;
   obtaining a next source code instruction from the set of source code instructions;
   determining whether an address of the next source code instruction is in the data structure;
   when the address of the next source code instruction is in the data structure including one or more addresses of method one or more of the set of source code instructions that creates one or more local objects upon execution of the one or more of the set of source code instructions, creating a local object on a local heap of memory using the next_source code instruction associated with the address of the next source code instruction such that local objects are stored in memory separately from non-local objects; and
   when the address of the next source code is not in the data structure including one or more addresses of one or more of the set of source code instructions that creates one or more local objects, creating a non-local object on a non-local heap of memory using the next source code associated with the address of the next source code such that non-local objects are stored in memory separately from local objects.

* * * * *

UNITED STATES PATENT AND TRADEMARK OFFICE
CERTIFICATE OF CORRECTION

PATENT NO. : 6,820,101 B2
DATED : November 16, 2004
INVENTOR(S) : David Wallman

It is certified that error appears in the above-identified patent and that said Letters Patent is hereby corrected as shown below:

Column 10,
Line 50, delete "method".

Signed and Sealed this

Fifth Day of April, 2005

JON W. DUDAS
*Director of the United States Patent and Trademark Office*